United States Patent [19]
Bathrick et al.

[11] Patent Number: 5,280,581
[45] Date of Patent: Jan. 18, 1994

[54] ENHANCED CALL-BACK AUTHENTICATION METHOD AND APPARATUS FOR REMOTELY ACCESSING A HOST COMPUTER FROM A PLURALITY OF REMOTE SITES

[75] Inventors: Erwin W. Bathrick, La Habra; Kenneth C. Kung, Cerritos; Todd E. Matthews, Santa Ana, all of Calif.

[73] Assignee: Hughes Aircraft Company, Los Angeles, Calif.

[21] Appl. No.: 843,873

[22] Filed: Feb. 27, 1992

[51] Int. Cl.⁵ .................. H04L 9/00; G06F 13/14
[52] U.S. Cl. .................................. 395/200; 395/325; 364/286.4; 364/286.5; 364/238.5; 364/222.5; 364/222.3; 364/DIG. 1; 340/825.34; 380/25
[58] Field of Search .............. 340/825.31, 825.34, 340/825.3; 395/200, 325, 500, 275, 725; 379/95, 93; 380/23, 25; 364/401, 408; 902/1

[56] References Cited

U.S. PATENT DOCUMENTS

| | | | |
|---|---|---|---|
| 4,430,728 | 2/1984 | Beitel et al. | 364/900 |
| 4,475,175 | 10/1984 | Smith | 364/900 |
| 4,604,686 | 8/1986 | Reiter et al. | 364/200 |
| 4,779,224 | 10/1988 | Moseley et al. | 364/900 |
| 4,799,153 | 1/1989 | Hann et al. | 364/200 |
| 4,801,787 | 1/1989 | Suzuki | 235/380 |
| 4,916,738 | 4/1990 | Chandra et al. | 380/25 |
| 5,113,499 | 5/1992 | Ankney et al. | 395/325 |

FOREIGN PATENT DOCUMENTS 0262859 4/1988 European Pat. Off. ....... G06F 1/00

OTHER PUBLICATIONS

*Computer Technology Review*, V (1985) Fall, No. 4, G. Horback, "Callback Security Unit Protects Switched Data Communication System".

Primary Examiner—Gopal C. Ray
Attorney, Agent, or Firm—W. K. Denson-Low

[57] ABSTRACT

A method and apparatus for remotely accessing a host computer from a remote location. The invention permits a user to remotely change a telephone number that allows the host computer to dial the user's current location. A user performs this change only after he has been strongly authenticated using a distributed user authentication protocol in addition to a simple user ID and password. This allows the user to move between locations and access the host computer, while the call-back feature protects the host computer from unauthorized intrusion. Also, a second registered user who does not have call-back authority may gain access to the host computer through a user that has call-back authority. In this case the user with call-back authority gains entry into the host computer and causes it to call the second registered user, who then enters a user ID and password to gain entry to the host computer. The present invention may be implemented in the host computer or in an interface coupled between the host computer and its modem.

4 Claims, 3 Drawing Sheets

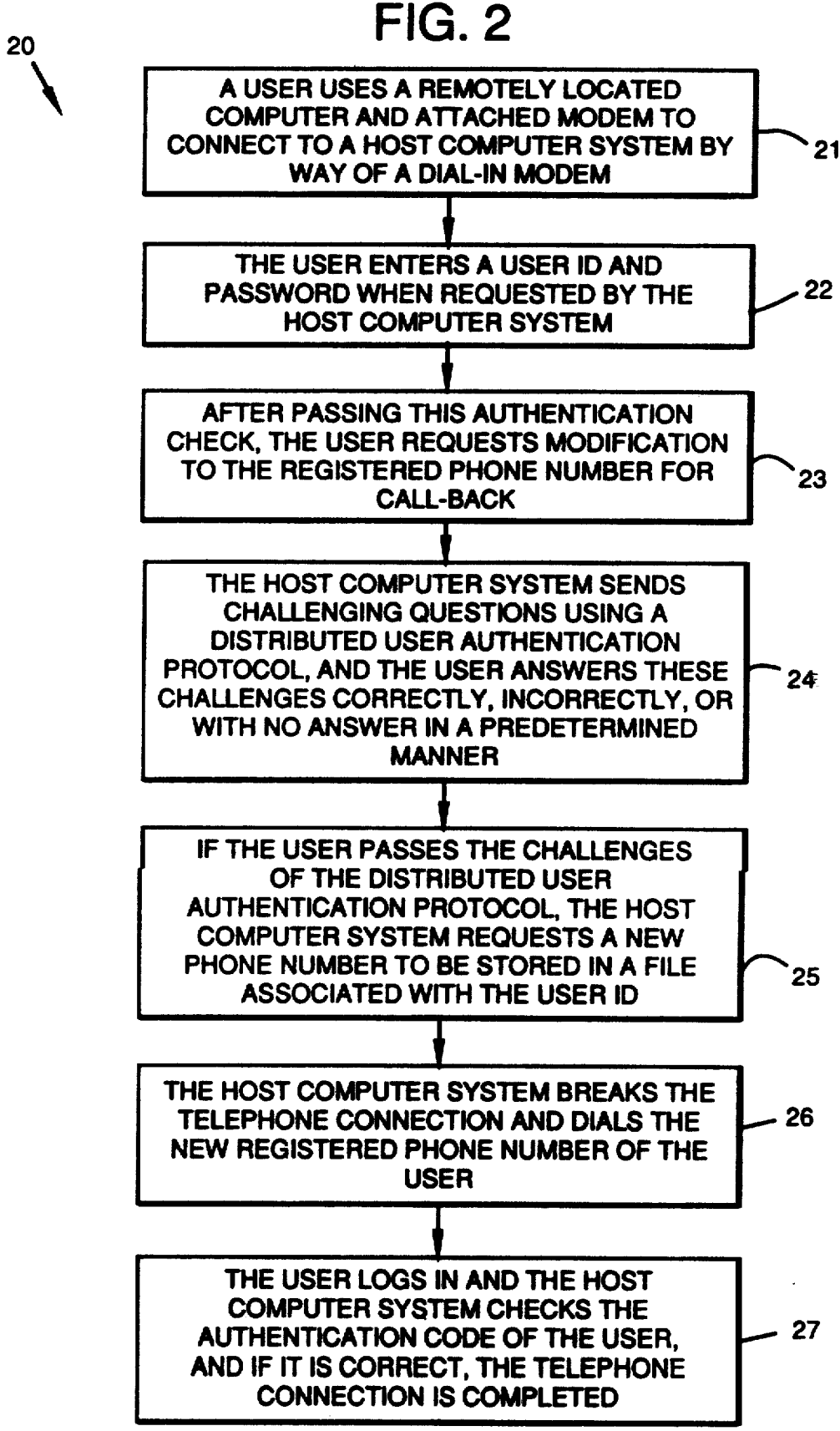

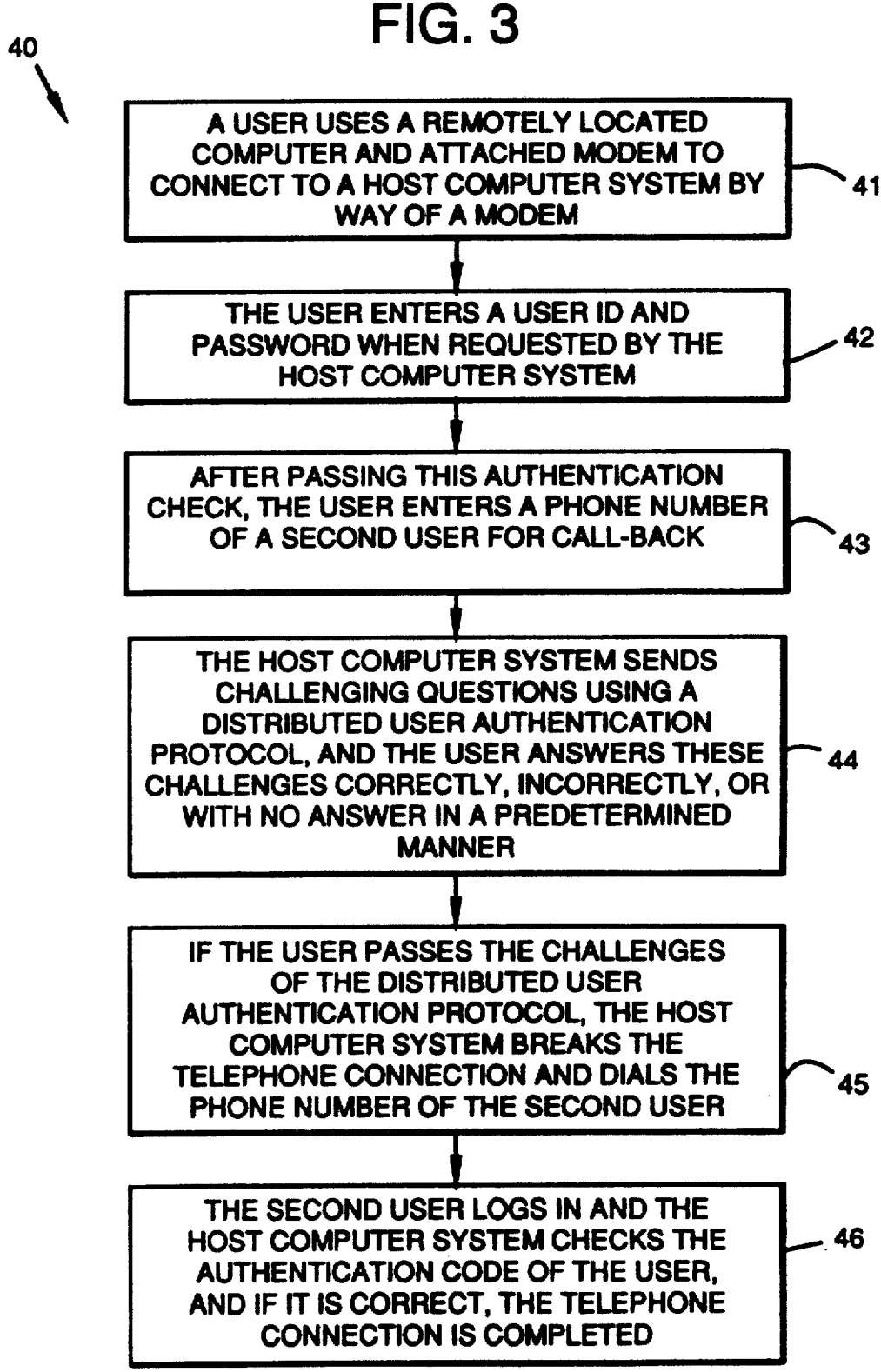

ENHANCED CALL-BACK AUTHENTICATION METHOD AND APPARATUS FOR REMOTELY ACCESSING A HOST COMPUTER FROM A PLURALITY OF REMOTE SITES

BACKGROUND

The present invention relates generally to methods for remotely accessing a host computer system, and more particularly, to methods that provide for remotely accessing a host computer system from a plurality of remote sites by a single user.

To protect a host computer system from outside intruders using a dial-in modem attached thereto, the host computer system may require users to use a call-back procedure. A typical conventional call-back procedure works as follows. A remote user of the host computer system registers a remote telephone number with the system administrator. This remote telephone number is one where the remote computer is located. Once the user is at the remote location, and after he signs on, the user provides a user identification code and password. Then, the host computer system will call back to the user at the registered phone number for further processing.

However, in the conventional procedure, a single user identification code permits the use of only one registered telephone number. If the user wants to use the host computer system from another location, he must register the new number ahead of time. For a user who frequently travels to different remote locations, this procedure does not permit him to switch telephone numbers easily and quickly. In addition, even if the telephone numbers of remote locations are known ahead of time, only one number can be registered at a time.

Consequently, the existing procedure is too inflexible to be widely used. It permits a user to use the system from one remote location and from one registered phone number. A user who moves around, has no way to access the host computer system from various remote sites.

Therefore it would be an advantage to have a remote access procedure that permits a remote user to move between remote locations and easily and quickly change the remote call-back telephone number to permit him to access the host computer system.

SUMMARY OF THE INVENTION

In order to provide for the above advantages, the present invention comprises a method that provides for remote accessing of a host computer system from a remote location. The method comprising the following steps. A remote user uses a remotely located computer and an attached modem to connect to the host computer system by way of a dial-in modem connected thereto. The remote user logs in by entering a user ID and password when requested by the host computer system.

After passing an authentication check by entering the correct user ID and password, the remote user requests a modification to his registered phone number for call-back. The host computer system sends challenging questions using a distributed user authentication protocol, and the remote user answers these challenging questions by providing correct answers, incorrect answers, or no answers in a predetermined manner.

If the remote user passes the challenging questions posed by the distributed user authentication protocol, the host computer system requests the input of a new phone number that is stored in a file on the host computer system associated with the user ID of the remote user. The host computer system breaks the telephone connection and dials the new registered phone number of the remote user.

The remote user again logs in and the host computer system checks his authentication code, and if the authentication code is correct, the telephone connection is completed and the remote user has access to the host computer system. Using the present procedure, a user can remotely call in, authenticate himself using a distributed user authentication protocol, and change the registered phone number as frequently as it needs to be changed, while the host computer system maintains security through the call-back mechanism.

The present invention permits a user to remotely change the registered telephone number for himself such that the host computer system can dial-back to the current location of the user. A user may perform this change only after he has been strongly authenticated using the distributed user authentication protocol in addition to simple user identification and password mechanism. This permits the user to move around from one location to another and be able to access the host computer system, which uses the call-back feature to protect itself from unauthorized intrusion.

The present invention also permits a first registered user to allow another authorized user to gain remote access to a host computer. After the first user gains access to the host computer using the authentication procedure, the first user asks the computer to call a phone number at a location of a second registered user that does not have call-back authority.

The authentication procedure of the present invention may also be implemented in an interface disposed between a modem and a host computer. After a remote user passes the appropriate password checks, the interface calls back the user and connects the remote user (or the second user) to the host computer. This offers additional protection of the information stored on the host computer such that intruders cannot have direct access to any information that is stored in the host computer or in a remote location.

The present invention is therefore more user friendly and more useful than the initially described conventional procedure. The present procedure provides a user who moves around to various remote locations the ability to access the host computer system from the remote locations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a flow diagram illustrating one procedure in accordance with the principles of the present invention; and FIG. 3 is a flow diagram illustrating a second procedure in accordance with the principles of the present invention.

DETAILED DESCRIPTION

Figure 1:
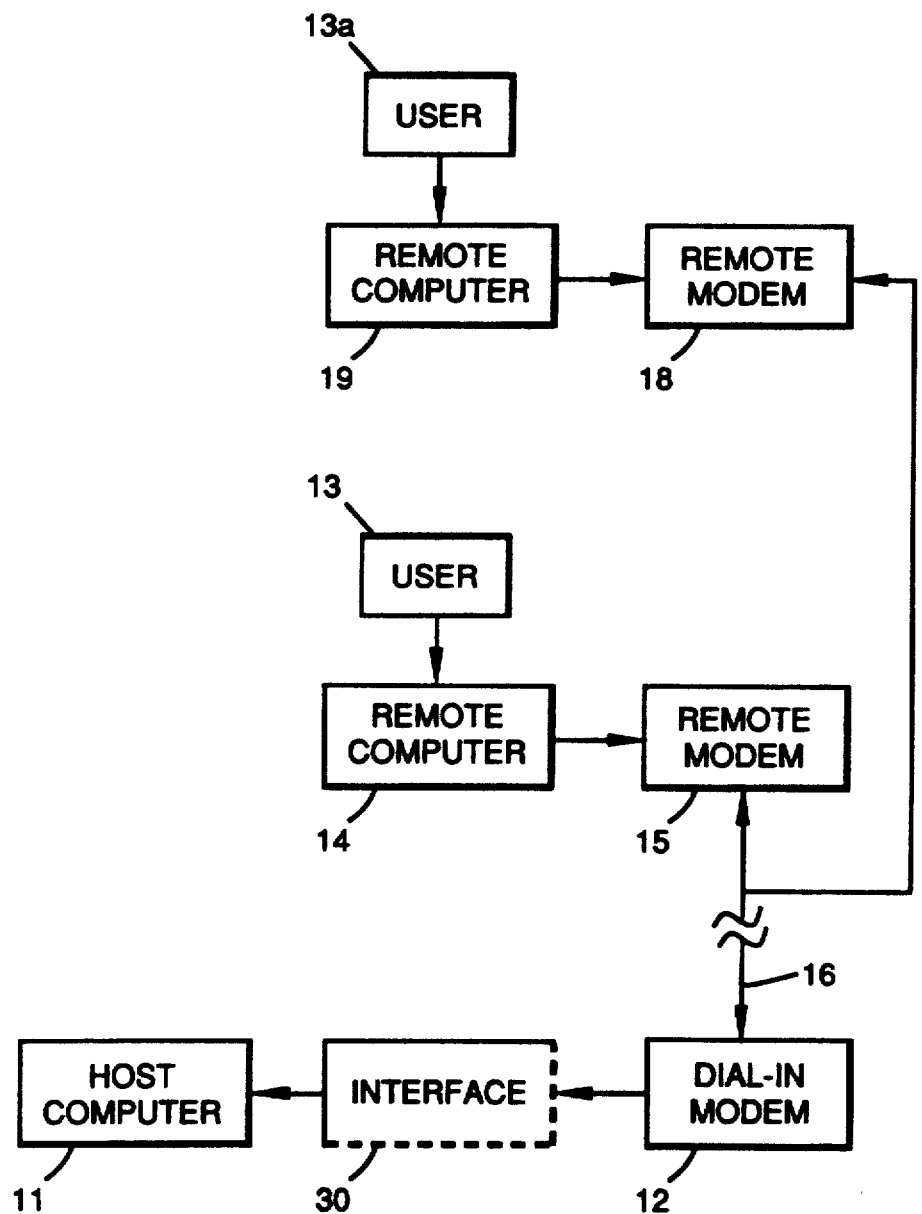
FIG. 1 shows the apparatus required to implement a procedure in accordance with the principles of the present invention.

Referring to FIG. 1, it shows the apparatus 10 used to implement a procedure in accordance with the principles of the present invention. The apparatus includes a host computer system 11, that has a dial-in modem 12 connected thereto. A user 13 is located at a remote location and has a computer 14, which may be a computer workstation or a terminal, for example. The computer 14 has a modem 15 connected thereto. The modem 15 and the dial-in modem 12 are connected by way of telephone lines 16, for example, or other conventional communications link.

Referring to FIG. 2, it shows a flow diagram illustrating one procedure 20 in accordance with the principles of the present invention that provides for remote accessing of the host computer system 11 from a remote location. The procedure 20 comprises the following steps, which may also be referred to as a procedural algorithm.

In step 21, a remote user 13 uses the computer 14 and attached modem 15 to connect to the host computer system 11 by way of the dial-in modem 12. In step 22, the remote user 13 enters a user ID and password when requested by the host computer system 11. In step 23, after passing this authentication check, the remote user 13 either requests modification of to the registered phone number for call-back or proceeds to step 26.

In step 24, the host computer system 11 sends challenging questions using a distributed user authentication protocol, and the remote user 13 must answer these challenges correctly, incorrectly, or no answer in a predetermined manner. The distributed user authentication protocol is described in detail in U.S. patent application Ser. No. 07/574,640, filed Aug. 29, 1990.

In step 25, if the remote user 13 passes the challenges of the distributed user authentication protocol, the host computer system 11 requests a new phone number to be stored in a file on the host computer system 11 for the user ID of the remote user 13. In step 26, the host computer system 11 breaks the telephone connection and dials the new registered phone number of the remote user 13. In step 27, the remote user 13 logs in and the host computer system 11 checks the authentication code of the remote user 13, and if it is correct, the telephone connection is completed.

The above-described procedure 20 has been implemented on a SUN computer workstation and has been demonstrated to work well. Call connections from outside the facility where the SUN workstation (host computer 11) is located have been established from various locations by different users. A user's registered phone number may be easily changed using this procedure. Attempted intrusion into the host computer 11 has not been successful.

The authentication procedure 20 of the present invention may also be implemented in the form of an interface 30 (shown in FIG. 1) that is disposed between the modem 12 and the host computer 11. After a remote user 13 passes the appropriate password checks, the interface 30 causes the modem 12 to call back the remote user 13 and connects the remote remote user 13 to the host computer 11. This offers additional protection of the information stored on the host computer 11 such that intruders cannot have direct access to any information that is stored in the host computer 11 or at a remote location that is accessible by the host computer 11 via the interface 30.

The authentication procedure of the present invention also permits a registered user 13 to allow a second registered user 13a to gain remote access to the host computer system 11. After passing the tests of the present authentication procedure, the registered user 13 asks the computer 11 (or interface 30) to call a phone number at a second remote location 17, such as a second remote modem 18 coupled to a second remote computer 19. This phone number may be at a location where the second authorized user 13a is located. The second user 13a desires to connect to the host computer 11, but is unable to because the user 13a is not registered for call-back authority.

With reference to to FIG. 3, it shows a flow diagram illustrating this second procedure 40 in accordance with the principles of the present invention that provides for remote accessing of the host computer system 11 from a remote location by a second registered user 13a that does not have call-back authority. The second user 13a has a second computer 19 and a modem 18 connected thereto. The procedure 40 comprises the following steps. In step 41, a remote user 13 uses a computer 14 and attached modem 15 to connect to the host computer system 11 by way of a dial-in modem 12. In step 42, the remote user 13 enters a user ID and password when requested by the host computer system 11. In step 43, after passing this authentication check, the remote user 13 enters a phone number of a second remote user 13a for call-back.

In step 44, the host computer system 11 sends challenging questions using a distributed user authentication protocol, and the remote user 13 must answer these challenges correctly, incorrectly, or no answer in a predetermined manner. In step 45, if the remote user 13 passes the challenges of the distributed user authentication protocol, the host computer system 11 breaks the telephone connection and dials the phone number of the second remote user 13a. In step 46, the second remote user 13a logs in and the host computer system 11 checks the authentication code of the second remote user 13a, and if it is correct, the telephone connection is complete.

Thus there has been described a new and improved method that provides for remotely accessing a host computer system from a plurality of remote sites by a single user. It is to be understood that the above-described embodiments are merely illustrative of some of the many specific embodiments which represent applications of the principles of the present invention. Clearly, numerous and varied other arrangements may be readily devised by those skilled in the art without departing from the scope of the present invention.

What is claimed is:

1. A method that provides for remote accessing of a host computer system from a plurality of remote locations by a user having a single registered remote phone number for call-back said method comprising the steps of:

using a remotely located computer having an attached modem to connect to the host computer system by way of a modem connected thereto;

logging on the host computer system by passing an authentication check by entering a user ID and password when requested by the host computer system;

after passing the authentication check by entering the correct user ID and password, requesting a modification to the user's registered remote phone number for call-back;

receiving questions sent by the host computer system using a distributed user authentication protocol which requires, the remote user to answer these questions by providing correct answers, incorrect answers, or no answers in a predetermined manner;

providing the appropriate answers to said questions;

after providing the appropriate answers to the questions posed by the distributed user authentication protocol, receiving a request from the host computer system for the input of a new registered remote phone number that is stored in a file on the host computer system associated with the user ID of the remote user;

providing that the host computer system breaks the telephone connection and dials the new registered remote phone number of the remote user; and again logging on the host computer system by passing the authentication check.

2. A method that provides a first user having a registered remote phone number for call-back for remote accessing of a host computer system capability to authorize remote accessing of a host computer system by a second user, said method providing the second user remote access to the host computer system from a remote location, said method comprising the steps of:

using by the first remote user a remotely located computer having an attached modem to connect to the host computer system by way of a modem connected thereto;

logging on the host computer system by the first remote user by passing an authentication check by entering a user ID and password when requested by the host computer system;

after passing the authentication check by entering the correct user ID and password, inputting by the first remote user a phone number of a second remote user for call-back;

receiving questions sent by the host computer system using a distributed user authentication protocol which requires the first remote user to answer these questions by providing correct answers, incorrect answers, or no answers in a predetermined manner;

providing the appropriate answers to said questions;

after providing the appropriate answers to the questions posed by the distributed user authentication protocol, the host computer system breaks the telephone connection and dials the phone number of the second remote user; and logging on the host computer system by the second user by passing an authentication check.

3. Apparatus that provides for remote accessing of a host computer system from a remote location, said apparatus comprising:

a first modem attached to a first remotely located computer;

a second modem for use by the host computer system;

an interface coupled between the host computer and the second modem that implements the following procedure:

a remote user uses the first remotely located computer and the first modem to connect to the host computer system by way of the second modem and interface connected thereto;

the remote user logs on by entering a user ID and password at the first remotely located computer when requested by the interface;

after passing an authentication check by entering the correct user ID and password, the interface sends questions using a distributed user authentication protocol, and the remote user answers these questions by providing correct answers, incorrect answers, or no answers in a predetermined manner;

if the remote user passes the questions posed by the distributed user authentication protocol, the interface requests the input of a phone number for call-back that is then stored in a file on the interface;

the interface breaks the telephone connection and dials the phone number; and the remote user again logs on the host computer system by passing the authentication check.

4. The apparatus of claim 3 wherein after the remote user passes the authentication check by entering the correct user ID and password, the remote user inputs a phone number for call-back that is associated with a second registered user, and if the remote user passes the questions posed by the distributed user authentication protocol, the interface breaks the telephone connection and dials the phone number of the second user, and the second user logs on the host computer system by passing an authentication check.

* * * * *